Figure 5:
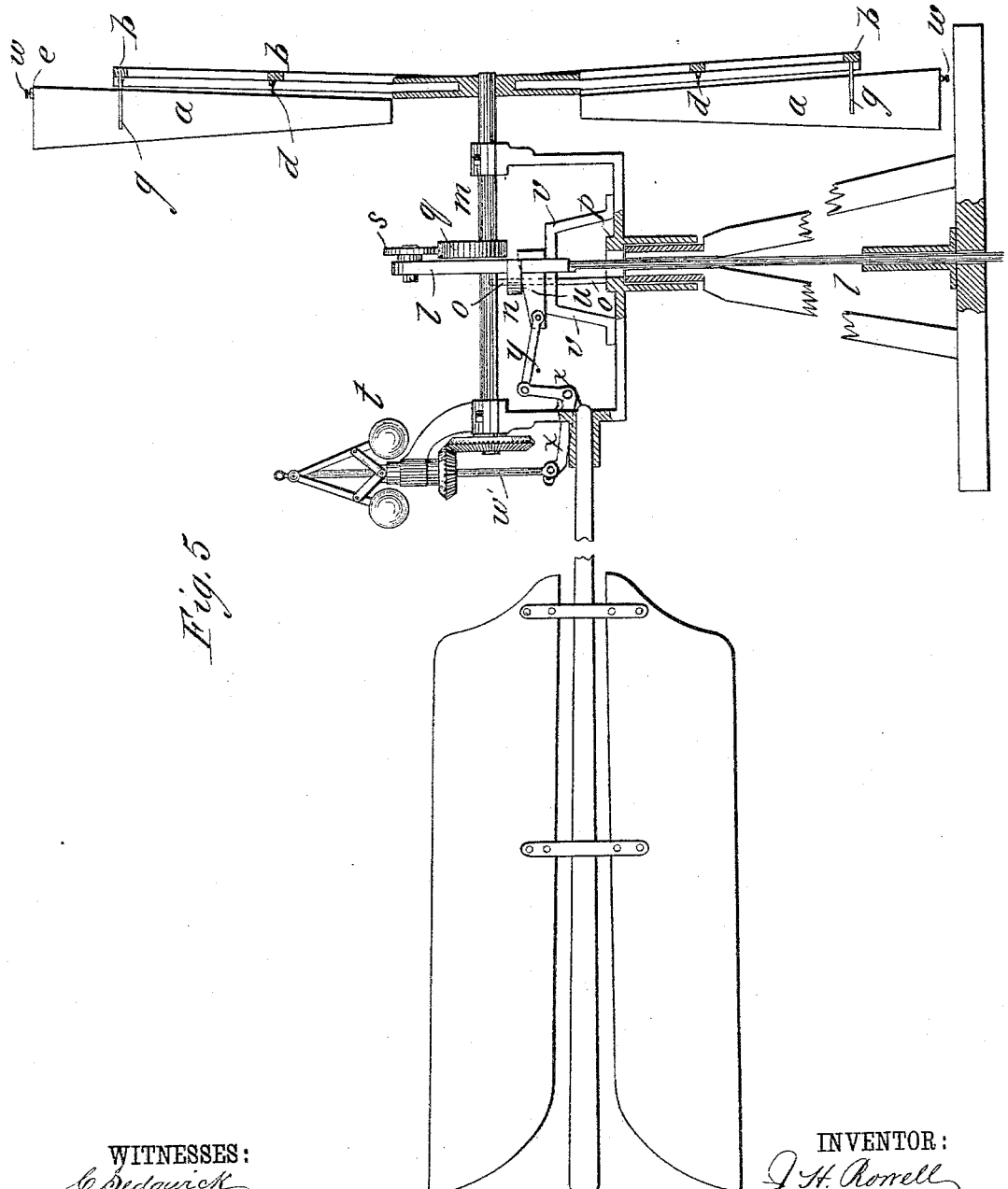

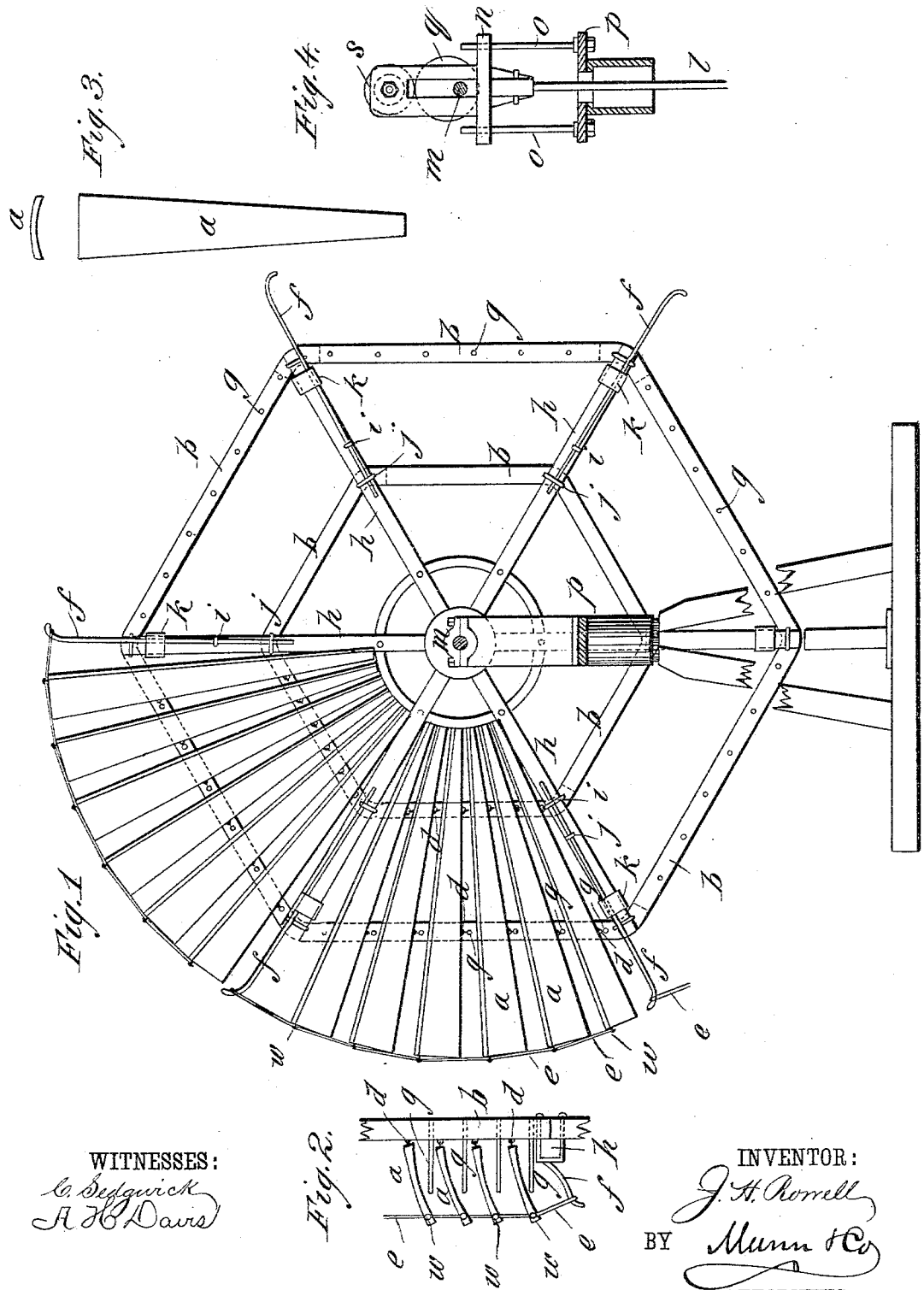

(No Model.)

J. H. ROWELL.
WINDMILL.

No. 318,928. Patented May 26, 1885.

2 Sheets—Sheet 2.

WITNESSES:
C. Sedgwick
A. H. Davis

INVENTOR:
J. H. Rowell
BY Munn & Co.
ATTORNEYS.

UNITED STATES PATENT OFFICE.

JOHN H. ROWELL, OF SOLON, MAINE.

WINDMILL.

SPECIFICATION forming part of Letters Patent No. 318,928, dated May 26, 1885.

Application filed April 26, 1884. (No model.)

*To all whom it may concern:*

Be it known that I, JOHN H. ROWELL, of Solon, in the county of Somerset and State of Maine, have invented a new and Improved Windmill, of which the following is a full, clear, and exact description.

This invention pertains to improvements in windmills; and it consists of the combinations of parts and their construction, substantially as hereinafter fully set forth and claimed.

Reference is to be had to the accompanying drawings, forming part of this specification, in which similar letters of reference indicate corresponding parts in all the figures.

Figure 1 is a front elevation of the wheel with part of the fans omitted. Fig. 2 is a detail of the wheel in side elevation. Fig. 3 represents one of the fans in end and side view. Fig. 4 is a detail of the contrivance of the pump-rod and driving-shaft, partly in section; and Fig. 5 is a sectional elevation parallel with the driving-shaft.

I employ radial and tapering fans $a$, of light thin metal or wood and of concave form on the side receiving the wind, which fans I pivot at one edge to the bars $b$ of the wheel-frame at $d$, and connect them at the outer ends by chains of wire links $e$ and pivots $w$, or with a continuous wire or flat band with holes for the pivots $w$ in several series, with a spring, $f$, to each series, adapted to hold the fans in the oblique position required for enabling the wind to take effect on them for revolving the wheel, and I arrange a stop pin or stud, $g$, with one or more of the fans $a$ to limit the swing of the fans, which are to turn on their hinges, according as the springs or the wind overpower each other, the wind tending to force the fans around edgewise to the wind, and the springs pulling them back sidewise thereto, according as the wind is strong or light, thus rendering the wheel self-regulating to the variations of the wind.

In the backward swing of the fans by the power of the wind they are arrested by the stop-pins $g$ when turned edgewise to the wind or thereabout, so that the propelling effect of the wind on the wheel will not be increased in the proportion of the wind, and in the forward swing, when the wind is light, said fans are arrested by said stop-pins in the proper oblique position for the best effect of the wind when it is light.

I propose to use adjustable springs for holding the fans to the wind with more or less resistance, according to the power required of the wheel, and have in this case employed torsion-springs for a simple arrangement of the springs along the arms $h$, to which they are fastened a suitable portion of their length by staples $i$ and $j$ with the outer portions suitably bent for the leverage by which the torsional action takes place, and have provided a sliding band, $k$, with each spring embracing it and the arm $h$, so as to straighten the springs and lessen the leverage to increase the torsion by shifting said slides outward, and increase the leverage and lessen the torsion by shifting said slides inward; but I do not limit myself to this particular arrangement of springs and means of adjusting the same.

For a simple and very easy working arrangement of means for operating the pump-rod $l$ by the driving-shaft $m$, I fit said rod with a cross-head, $n$, to work on vertical guides $o$ attached to the turn-table $p$, to work without lateral vibration, and provide the driving-shaft $m$ with an eccentric-wheel, $q$, to lift the pump-rod by a friction-roller, $s$, mounted on it to run over the wheel $q$ for the pump-rod to be lifted by the power of the wind-wheel and to be let fall by its own weight, or rod $l$ may have a roller under wheel $q$, to be forced down thereby, which enables the pump-rod to work very smoothly by avoiding the shocks and jars which the lateral vibration of a driving-crank causes, and it also enables the stroke of the pump to be shortened by the use of any device to arrest it by the cross-head or by any other stop under which a slide-bar or the like may be thrust by hand or otherwise, so as to limit the range which the wheel $q$ gives to the rod, which may sometimes be desired, as when the power of the wind is too light to work the rod the full stroke. For this purpose and to effect the same automatically, I propose to employ a governor, $t$, in connection with the stop-slide $u$ for shifting said slide under the cross-head $n$ when the balls of the governor fall, the slide being arranged over a support, $v$, by which it will hold the weight of the rod. The slide may be inclined to vary the limit of the pump-rod's motion proportionately to the power of the wind. I may also use a slide at the base of the tower to be worked by hand for shortening the stroke of the pump-rod when it may be preferred to do so.

The rod $w'$ of the governor may be connected to the slide $u$ by a bell-crank, $x$, and link $y$, or by any other approved means.

Having thus fully described my invention, I claim as new and desire to secure by Letters Patent—

1. The tapered radial fans $a$, hinged at one edge to the wheel-frame and connected at the outer end at or near the opposite edge with links $e$ and pivots $w$ to springs $f$, arranged to hold said fans to receive the wind for driving the wheel, substantially as described.

2. The tapered radial fans hinged to the wheel-frame at one edge, in combination with the torsional springs connected to the outer end at or near the opposite edge of the fans, the slide fitted upon the wheel-frame and the springs, said springs being disposed to hold said fans to receive the wind to drive the wheel, substantially as and for the purpose set forth.

3. In a windmill, the pump-rod carrying a roller bearing upon an eccentric of the driving-shaft, said rod also having a cross-head, in combination with the inclined slide disposed below the said cross-head and the automatic governor connected by a bell-crank lever and link to said slide, substantially as and for the purpose set forth.

JOHN H. ROWELL.

Witnesses:
E. G. SAVAGE,
HAZEN BLACK.